United States Patent
Eleyan et al.

[11] Patent Number: 6,144,370
[45] Date of Patent: Nov. 7, 2000

[54] ELECTROMAGNETIC ACTIVE TRACKBALL CONTROL SYSTEM USING MAGNETS ENERGIZED IN SEQUENCE WHICH CAUSE THE TRACKBALL TO MOVE

[75] Inventors: Nadeem N. Eleyan, Austin, Tex.; Stephen M. Bobbio, Wake Forest, N.C.

[73] Assignee: The University of North Carolina at Charlotte, Charlotte, N.C.

[21] Appl. No.: 08/834,720

[22] Filed: Apr. 1, 1997

Related U.S. Application Data

[60] Provisional application No. 60/017,389, May 8, 1996.

[51] Int. Cl.$^7$ ...................................................... G06F 17/30
[52] U.S. Cl. ........................ 345/167; 345/164; 345/159; 273/148 B
[58] Field of Search .................................. 345/167, 164, 345/159; 273/148 B

[56] References Cited

U.S. PATENT DOCUMENTS

| | | | |
|---|---|---|---|
| 4,538,476 | 9/1985 | Luque | 74/471 |
| 4,550,316 | 10/1985 | Whetstone et al. | 340/710 |
| 4,739,315 | 4/1988 | Soma et al. | 340/710 |
| 4,868,549 | 9/1989 | Affinito | 345/164 |
| 4,896,554 | 1/1990 | Culver | 74/471 |
| 4,952,081 | 8/1990 | Hedtke | 388/825 |
| 4,982,618 | 1/1991 | Culver | 74/471 |
| 5,008,528 | 4/1991 | Duchon | 250/221 |
| 5,162,780 | 11/1992 | Solhjell | 340/710 |
| 5,171,978 | 12/1992 | Mimlitch et al. | 250/221 |
| 5,185,561 | 2/1993 | Good et al. | 318/432 |
| 5,223,828 | 6/1993 | McKiel, Jr. | 340/825.19 |
| 5,237,311 | 8/1993 | Mailey et al. | 340/710 |
| 5,260,696 | 11/1993 | Maynard, Jr. | 345/163 |
| 5,270,692 | 12/1993 | Rockwell | 345/163 |
| 5,432,530 | 7/1995 | Arita | 345/159 |
| 5,470,232 | 11/1995 | Kelso et al. | 434/45 |
| 5,583,541 | 12/1996 | Solhjell | 345/163 |
| 5,696,537 | 12/1997 | Solhjell | 345/164 |
| 5,784,052 | 7/1998 | Keyson | 345/167 |

*Primary Examiner*—Thomas G. Black
*Assistant Examiner*—William Trinh
*Attorney, Agent, or Firm*—Lynn E. Barber

[57] ABSTRACT

A track ball control system which is attachable to a computer system that has a display screen on which a cursor is positionable, including at least one track ball regulator for providing physical control of the position of the track ball in response to signals from the control system. These signals depend on the location of the cursor on the display screen and cause the track ball to change in movement. This change in movement may be a vertical change, and/or an azimuthal change. The operator does not control this change in movement except indirectly by knowingly or unknowingly positioning the cursor in a position which causes the signals to be sent to the track ball.

9 Claims, 5 Drawing Sheets

ELECTROMAGNETIC ACTIVE TRACKBALL CONTROL SYSTEM USING MAGNETS ENERGIZED IN SEQUENCE WHICH CAUSE THE TRACKBALL TO MOVE

REFERENCE TO PRIOR APPLICATION

This application claims the benefit of U.S. Provisional Application No. 60/017,389, filed May 8, 1996.

BACKGROUND OF THE INVENTION

1. Field of the Invention

This invention relates to systems for control of computer track balls, and in particular pertains to a device for controlling track ball movement for enabling sensing of features shown on a computer screen, for example, height of features on a topographic map, for restricting movement of the cursor on the screen in certain screen areas, and for forcing cursor movement in a particular screen direction.

2. Description of the Related Art

Figure 1:
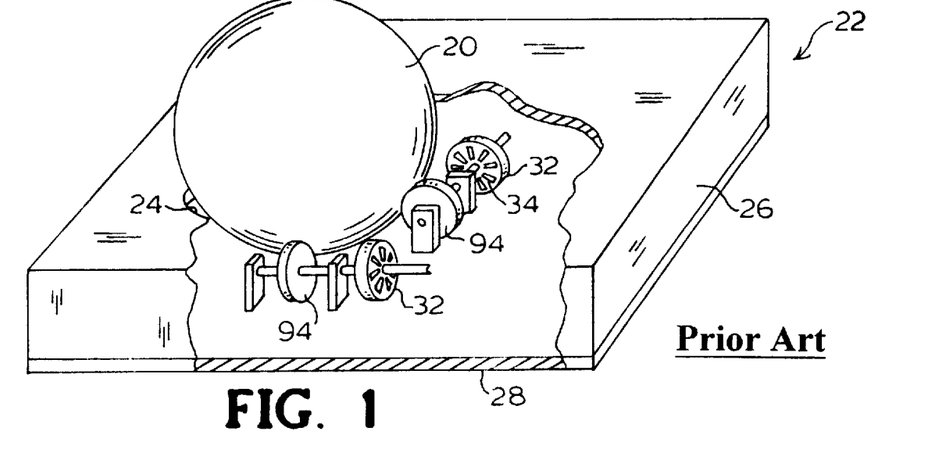
FIG. 1 is a perspective view of a typical prior art track ball.

Computers having movable input devices, known as track balls or mice, enable movement of a cursor on the computer display device (screen) without requiring operator knowledge of programming or advanced keyboard commands. Standard track balls are configured so that motion of the cursor on the computer screen is controlled by movements of the track ball in a pathway that may be defined by a series of X,Y coordinates. As shown in FIG. 1, the ball 20 of prior track ball device 22 is mounted in a hole 24 in a track ball cover 26 so that it rotates freely on a mounting base 28 in response to pressure of one or more fingers on the portion of the ball above the hole. Between the cover 26 and base 28, there is generally a pick-up wheel 94 on one side of the ball which is in contact with the track ball 20 for indication of the X-coordinate and another pick-up wheel 94 on another side of the ball, 90° from the first pick-up wheel, and also in contact with the track ball, for indication of the Y-coordinate. An encoder 32 for each direction translates the physical movement of the track ball into movement of the cursor on the screen. Each encoder 32 is a wheel having slots 34. Every time an open slot 34 allows light to pass, a small voltage pulse is generated by an associated photo diode (not shown). The angle turned through by the wheel may be determined by a counter counting the voltage pulses. There are usually two photo diode/light source assemblies, so that clockwise movement and counterclockwise movement of the encoder may be distinguished. An idler bearing (not shown) is placed beneath the ball to support it. The fact that mice connected to computers are analogous to track balls in both structure and function means that the aspects of the invention discussed herein are directly usable or are adaptable by those of skill in the art for use with mice as well as with track balls.

The ease of movement of the cursor at any location on the visible screen, or to areas off the screen, can result in problems in placing and keeping the cursor in a desired position and in keeping the cursor from particular areas of the screen. In addition, it is often difficult to be sure where the cursor is located on the screen. In a number of different types of screen displays, it also would be educational or otherwise desirable to be able to sense vertical movement of the track ball as the cursor is moved across features shown on the screen, for example, across lines, or across typographical features on a map.

Examples of patents for controlling cursor movement and for previously known feedback mechanisms for track balls include the patents of Luque (U.S. Pat. No. 4,538,476); Whetstone et al. (U.S. Pat. No. 4,550,316); and Soma et al. (U.S. Pat. No. 4,739,315).

The patent of Solhjell (U.S. Pat. No. 5,162,780) provides a Trackball for Data Entry and Control with Optimized Height in which the vertical height of the ball may be adjusted relative to the housing to suit an operator's preference. There is no suggestion of adjusting the track ball height in relation to features on the computer screen.

Efforts to address one or more of these concerns are found in the patents of Affinito (U.S. Pat. No. 4,868,549 for a Feedback Mouse which generates resistance-to-motion feedback to the mouse which may be physically perceived by the user); Culver (U.S. Pat. No. 4,896,554 for a Multifunctional Tactile Manipulatable Control provides an operator with an enhanced tactile sense of the action of the control mechanism which includes a rotating cylinder journalled in a movable bar slidable in a grove in a deflectable support rack); Hedtke (U.S. Pat. No. 4,952,081 for Manual Rotary Sphere Control of an Electronic Equipment with Touch Sensing Scale Marks, which has controllable braking devices of the control sphere used for tape recording and playback); Arita et al (U.S. Pat. No. 5,432,530 for a Pointing Device and Method of Control of Same, which provides a means of switching from positional control for controlling the position of a cursor to speed control for controlling the speed of movement of the cursor); and Kelso (U.S. Pat. No. 5,470,232) for a Reconfigurable Aircraft Stick Control and Method for Connecting and Removing Stick Control from Aircraft Simulator, which enables pitch and roll of an aircraft to be simulated).

The patent of Good (U.S. Pat. No. 5,185,561) for a Torque Motor as a Tactile Feedback Device in a Computer System uses as a computer input device, a motor in a hand held housing, a shaft extending from the motor to be rotated by hand and provide torque to a user's hand, a position indicator for output to a computer indicating the shaft rotational position, and an input to the motor for controlling torque applied to the shaft by the motor from a computer output. The torque motor and shaft may be configured as the shaft of a conventional joystick so that the shaft can be manipulated to manipulate the display and could be twisted for rotational manipulation and torque feedback.

It is therefore an object of the invention to provide a device which allows a track ball to be interactive and provide physical feedback from the computer to the user, targeted at the user's fingertips, to provide various sensations that are synchronized or related to the visual and/or auditory environment of the software. Thus, the invention enables manipulation of a virtual environment generated by the computer to enhance interaction with the virtual environment and provide tactile feedback to the user.

It is a further object of the invention to provide a device which can be used to enhance the effect of a video game, provide additional information in a computer-assisted design (CAD) or virtual reality application, or enable the physically impaired to receive information from the software that might not otherwise be available to them.

It is a further object of the invention to provide a track ball control system for a computer, having at least one track ball regulator for providing physical control of a track ball position in response to signals which are generated depending on the location of the cursor, so that the track ball has a resultant change in movement in response to the signals which is distinct from and not dependent on the direct control of the track ball by the operator.

Other objects and advantages will be more fully apparent from the following disclosure and appended claims.

SUMMARY OF THE INVENTION

The invention herein is a track ball control system which is attachable to a computer system that has a display screen on which a cursor is positionable. The track ball system comprises at least one track ball regulator for providing physical control of the position of the track ball in response to signals from the control system. These signals depend on the location of the cursor on the display screen and cause the track ball to change in movement. This change in movement may be a vertical change, as in the first embodiment of the invention, and/or an azimuthal change, as in the second and third embodiments of the invention. The operator does not control this change in movement except indirectly by knowingly or unknowingly positioning the cursor in a position which causes the signals to be sent to the track ball.

Other objects and features of the invention will be more fully apparent from the following disclosure and appended claims.

DETAILED DESCRIPTION OF THE INVENTION AND PREFERRED EMBODIMENTS THEREOF

The present invention provides a device which allows enhanced control of a computer track ball, or computer mouse, in relation to cursor movement on a computer display screen. Hereinafter, reference to the track ball control system of the invention includes analogous mouse control systems.

Figure 2:
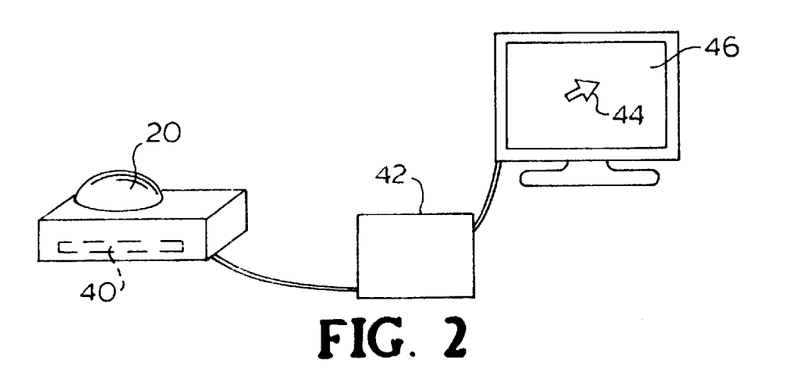
FIG. 2 is a schematic representation of the invention.

In general, the device of the invention comprises: a track ball control system, which is attachable to a computer system having a display screen, and a cursor which is positionable on the display screen as is known in the art. Referring now to FIG. 2, the track ball control system of the invention comprises at least one track ball regulator 40 for providing physical control of the position of the track ball 20 in response to signals from controller 42, which signals are generated depending on the location of a cursor 44 on a screen (FIG. 2; not to scale). The signals cause the track ball 20 to have a resultant change in movement which is independent of direct control of the track ball by the operator.

There are three main embodiments of the invention related to the type of movement of the track ball, which can be present singly or in any combination. In these embodiments, the change in movement may be a vertical change, as in the first embodiment of the invention, and/or a azimuthal change, as in the second and third embodiments of the invention which relate to braking motion and forcing motion, respectively.

Although the operator generally has some initial control over the positioning of the cursor on the screen, the invention essentially modifies the control by the operator when the cursor reaches an area of the screen which triggers the signals to be sent to cause the track ball movement, and in the second and third embodiments, related cursor movement of the invention. Thus, in the first embodiment, when the cursor moves across a particular screen position, there is automatic vertical movement of the track ball in response to signals generated by the software indicating that the cursor is changing from a particular x,y position to another x,y position which the computer software "knows" has a particular topography, line or design display.

In the second and third embodiments, the software is also programmed as is known in the art to have the information on exactly where the cursor is positioned. In addition, however, the software has preprogrammed therein that the location of the cursor in particular areas or types of areas will cause a signal to be sent to the track ball device to change the azimuthal movement characteristics of the track ball. In the second embodiment, the movement of the track ball, and thus the cursor, is damped in response to the signals. In the third embodiment, the movement of the track ball, and thus that of the cursor, is forced in a particular direction in response to the signals.

Figure 3:
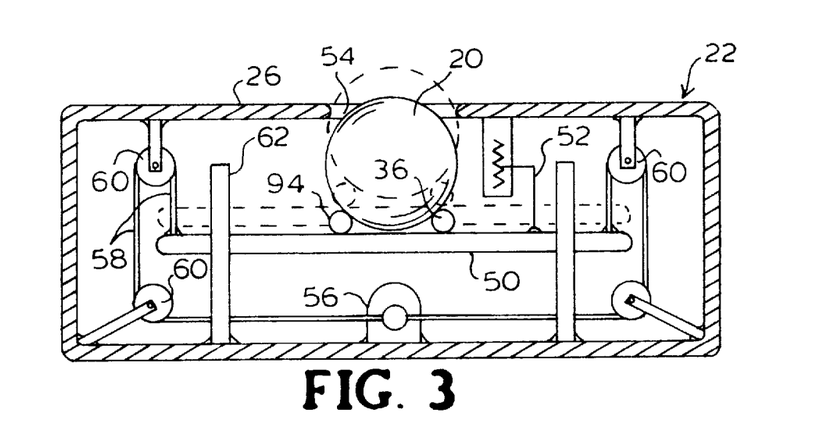
FIG. 3 is a cross-sectional side view of the first embodiment of the invention in which the track ball changes elevation in response to signals from the computer.

Referring now to FIG. 3, in the first embodiment of the invention, in which the elevation of the track ball 20 is varied, the interactive track ball is part of a simple feedback control system where the computer determines the desired elevation of the track ball depending on the position of the cursor on the screen, and then drives a vertically movable horizontal positioning stage 50 (track ball regulator) to elevate the track ball 20 to that height level as shown in the dotted lines (FIG. 3). Information on the actual height that the positioning stage 50 has reached is sent as feedback to the computer by a potentiometer 52 attached to the elevating mechanism (discussed further below).

To establish a clear contrast between a stationary plane, when the ball is at its lowest elevation, and the plane on which the ball rests at a particular moment, the track ball cover 26 is preferably stationary with a circular hole 54 in it. Hole 54 is preferably larger than prior holes 24 (FIG. 1) to allow a wider range of movement and free rotation of the ball 20 in hole 54. When the track ball 20 is elevated or lowered in the circular hole 54 (FIG. 3), a user's hand resting on the track ball cover 26 can feel the slight changes in altitude of the ball 20 with respect to the top plate 26. Existing shaft encoders 94 and idlers 36 are positioned beneath the track ball as in the prior track balls.

A stepping motor 56 is preferably used to move the positioning stage 50 and track ball 20 up and down. Any motor may be used with the mechanical stage to elevate the track ball so long as the motor has the correctly sized shaft. Use of a stepping motor 56 improves performance of the track ball 20, as the actual height of the ball closely follows the desired height signal generated by the computer without overshoot, and with very little time delay.

Guide rods 62 are positioned on each side of the ball 20 through the stage 50 so that movement of the stage is only vertical (up or down, and not to the side). The mechanical positioning stage 50 functions to translate the rotational motion of the motor to linear, vertical motion, using thin lift control cables 58 connected preferably near or at the ends of the mechanical stage 50 carrying the track ball 20. The cables 58 extend around a series of pulleys 60, as shown in FIG. 3, to a motor 56, which winds up the cable and lifts the mechanical stage, and thus the ball, in response to signals from the computer using standard motor drive electronics.

The desired height level in the first embodiment can be determined by the computer (controller) as a function of the graphical topography shown on the screen. If the screen shows a topographic map, movement of the cursor from the bottom of a valley to the top of a hill results in elevation of the track ball under the user's fingertips. In the preferred version of this embodiment, if the screen shows a textured surface or a surface with lines or other visual markings, the track ball of the track ball device is raised and lowered as a function of where the cursor is on the textured and/or marked surface. The variation in elevation may be set to be slight or dramatic depending on the type of surface depicted, and the desired range in track ball elevation, within the range physically possible due to the physical dimensions of the track ball device.

Figure 4:
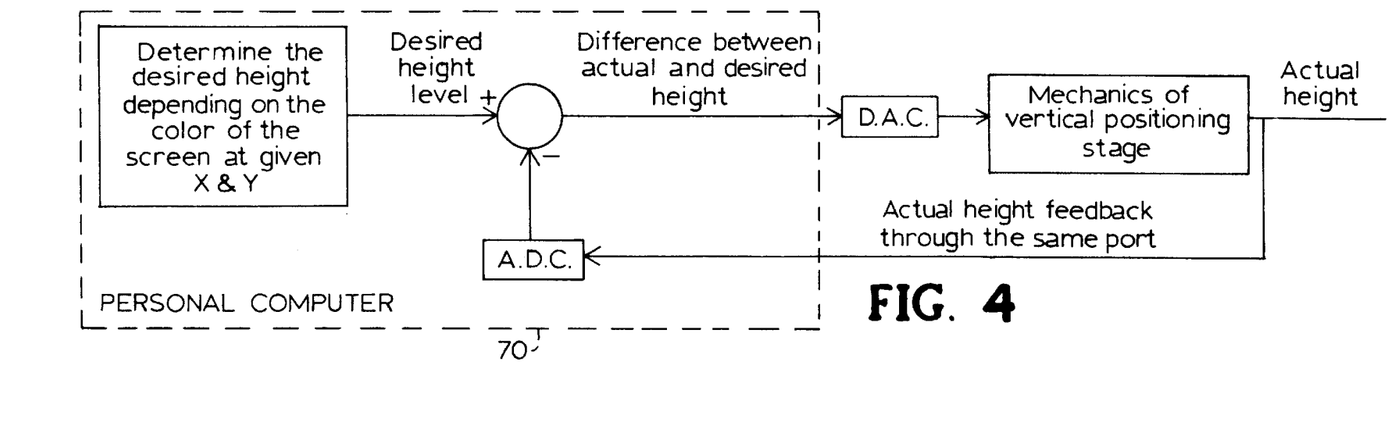
FIG. 4 is a schematic diagram of the invention when a computer is used as a main controller.

A computer 70 may be utilized as the main controller for the invention as shown in FIG. 4. In the first embodiment, the computer 70 determines the desired height level (based on signals received specially programmed computer software), sends the height command to the positioning stage, and receives feedback from the positioning stage to compare and determine error in one embodiment. The output of the computer may be taken through the parallel port, and the feedback may be read through the game port, if the computer is not required for other tasks, and if speed is not critical. Computers with special I/O boards (as are readily available) may use some of the additional I/O ports for control and feedback.

Figure 5:
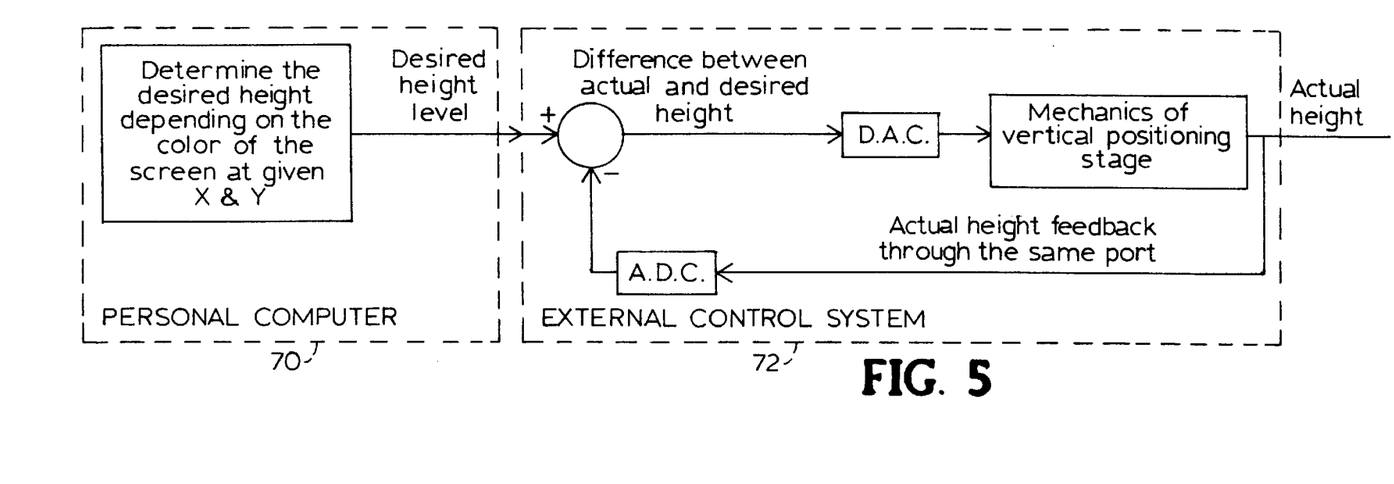
FIG. 5 is a schematic diagram of the invention when an external controller is used.

Alternatively, the computer 70 may only be needed for determination of the desired height, with an external controller 72 being used to take the height determination from the computer 70 and position the stage 50 at the desired height (FIG. 5). This embodiment is preferred because the control system sampling rate is then separate from the software, so that the track ball height may be tuned without slowing the software.

In both of the above-discussed embodiments of the control system, position feedback tends to produce a finite error in the steady state position so that the ball stays still but slightly off the exact reference point; however, the steady state error is not noticeable by the user since the ball is not moving. The controllers could also be built as proportional integral derivative (PID) controllers to eliminate steady state error if necessary, for example, in cases where more precision is required.

In one variation of this embodiment, the controller may be operated in a closed-loop configuration, as shown in FIGS. 4 and 5, where the exact elevation reached by the track ball is collected using a slide potentiometer 52 (FIG. 3) to measure the exact "Z coordinate" (upward and downward movement) fixed on the moving stage, with feedback to the computer being through the game port. The slide potentiometer 52 employs a resistor with a reference voltage, is connected to the stage and registers the actual elevational position of the stage, which is fed back to the computer using standard means. A sliding contact moves with the lifted or lowered stage, and the voltage on the contact changes with position. Thus, if the voltage is $v_1$ at the top stage elevation, it is $v_1/2$ halfway down, and 0 at the lowest elevation. Alternatively, the shaft of the motor 56 may itself be provided with an encoder to provide the height feedback signal in a digital way.

In the closed-loop configuration, the error signal is developed between the reference and actual positions. The summing port (the circle in FIGS. 4 and 5) obtains the difference between the signals, with the output providing the difference between the desired height level and the actual height.

Sampling frequency may be increased by operating in an open-loop configuration where there is no feedback, and one just assumes the device is following the reference signal.

In addition to, or instead of providing elevational feedback as in the first embodiment of the invention, the invention in its second and third embodiments, respectively, is utilized to give the user the feeling of damping and resistance when moving in an undesired direction, or to force the user to move the cursor in a particular direction. In these cases, it is the azimuthal motion of the track ball which is affected.

Damping and forced motion in these two embodiments may be achieved in a number of ways. In damping, the track ball can restrict the user from removing the cursor from a certain area of the screen (e.g., some particular icon in a computer-assisted design (CAD) program), or from the visible area on a screen, until the task that needs to be performed is accomplished, or to simply provide the feeling of "detents" as for example occurs in the operation of a multiposition switch. If the user attempts to use the track ball to move the cursor from that area, the user feels a resistance in the movement of the track ball.

Figure 6:
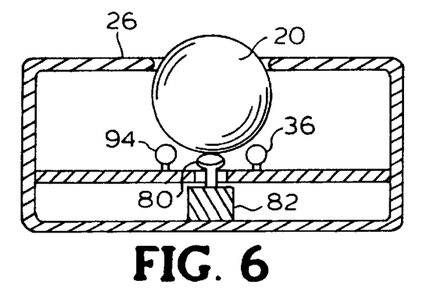
FIG. 6 is a cross-sectional side view of a second embodiment of the invention having a brake beneath the track ball.

In a simple damping device, a small mechanical brake 80 is installed under the track ball 20 (FIG. 6). Preferably the brake 80 is made of rubber or padded with a layer of rubber or other deformable material to give various degrees of resistance to allow damping of the movement of the track ball 20. If the track ball is sufficiently heavy, the upward force exerted by the brake will not cause the track ball to move in a vertical direction and lose contact with the X and Y shaft encoders.

Figure 7:
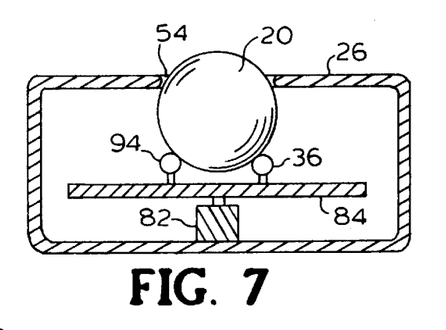
FIG. 7 is a cross-sectional side view of the second embodiment of the invention having a brake plate.

The braking motion of the brake can also be controlled, for example, by a solenoid for simple braking motion. As shown in FIG. 6, a brake pad 80 beneath the ball is connected to a computer electromagnetic device, such as a small solenoid 82, which pushes the brake pad 80 up to contact the bottom of the ball 20. This works well if the ball is large and heavy; however, if the ball is lighter, the upward motion may lift the ball of the existing pickups and idlers. In this case, another braking mechanism may be used, such as mounting the idlers and encoders on a brake plate 84 which is raised in response to a signal from the electromagnetic device so that the ball contacts the edge of hole 54 in cover 26 (FIG. 7). The cover 26 acts as a restraining plate.

Figure 8:
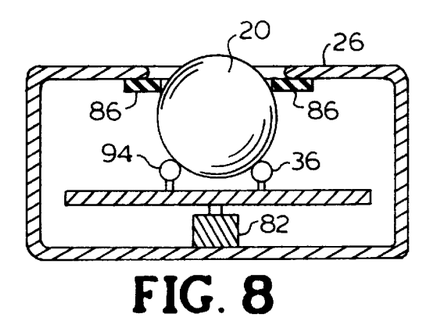
FIG. 8 is a cross-sectional side view of the second embodiment of the invention having a spongy rim beneath the track ball cover.

Alternatively, a separate restraining plate, for example a rubber rim, may be added beneath the cover 26 to contact the ball when the ball is elevated (FIG. 8). Use of a rim 86 of rubber or other spongy material allows variable braking, since the more the ball is lifted, the more the spongy material is compressed and the greater is the braking force. A stepping motor may also be used to gain multiple levels of damping and the mechanism would resemble the device of FIG. 3, except for the addition of a contact rim 86 (FIG. 8) placed beneath the hole 54. Control would similarly be provided by the systems shown in FIGS. 4 and 5 in exactly the same way as described previously for the first embodiment.

Figure 9:
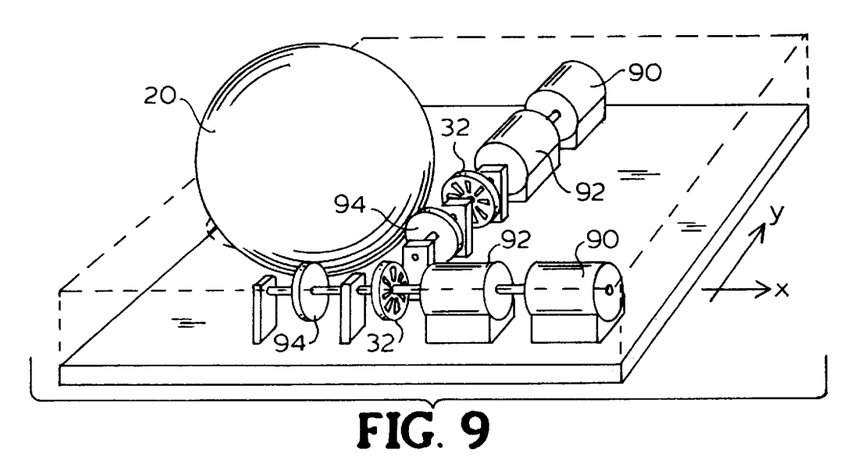
FIG. 9 is a perspective view of a track ball of a third embodiment of the invention in which the movement of the track ball is controllable by drive motors.

In the third embodiment of the invention, the track ball 20 can also be forced to move in a particular direction, so that, for example, when the track ball is being used to control a graphical representation of an object being pulled up a sloped surface, the track ball turns against the desired motion of the user in the direction, pulling the object down to give the feeling of a gravitational field to the user. This embodiment of the invention may be used to produce forced motion of the track ball, for example, to have the ball roll in a certain direction without the user causing it to roll, as when the software does not want the user to access a certain region of the screen and causes the ball to roll in another direction as if repelled by the region. In this embodiment, two motors 90 are preferably used, each of which may have a clutch 92 to mechanically disconnect the motors when they are not being engaged by the computer (FIG. 9). The preferred motors 90 are stepping motors as shown in FIG. 9 which are of a size capable of moving the ball. Each of the stepping motors 90 controls motion of the track ball 20, and thus of the cursor, in a single direction (one for motion in an X-direction and one for motion in a perpendicular Y direction). The torque of the motor is transferred to the ball through a contact wheel 94 that engages the side of the ball. The advantage of stepping motors, as compared to geared DC motors, is that stepping motors allow the ball to turn freely when they are not powered up so that clutches are not required.

Preferably in the third embodiment the invention does not completely override the operator. The preferred type of "repulsion" is shown diagrammatically in FIG. 10. When the cursor is in any of the areas designated "I", there is no effect of the invention, and the ball and cursor operate normally. When the cursor approaches the zone Z around an area that is to be protected from easy access ("P"), the motors begin to turn against the user's motion making it more difficult to move the ball, and if the user lifts his hand off the ball, the ball actually moves (rolls) in a direction to take the cursor out of the zone Z and farther away from the protected area P. By exerting more force, the operator can force the cursor over zone Z into the protected area P.

The third embodiment of the invention also can simulate attraction. For example, in a CAD art program where a possible position of the cursor is on the word "brush", if an operator clicked the mouse on "brush", the invention might enable an "attraction" (enhanced movement) toward all brush choices, such as broad, thin, splatter, etc. and not to other choices. Once a choice was made, then the attraction would be turned off and the operator would be unhindered from other operations.

In addition to, or instead of the vertical movement of the ball in response to topographic changes on the screen in the first embodiment, the ball may also be "powered" by attractions and/or repulsions in response to topography in the third embodiment. For example, as the cursor is moved across a representation of a mountain range on the screen, the ball may be made to move with more difficulty as the cursor goes up a mountain, and the cursor may be made to move down a mountain as the ball rolls by itself in the corresponding direction.

Figure 11:
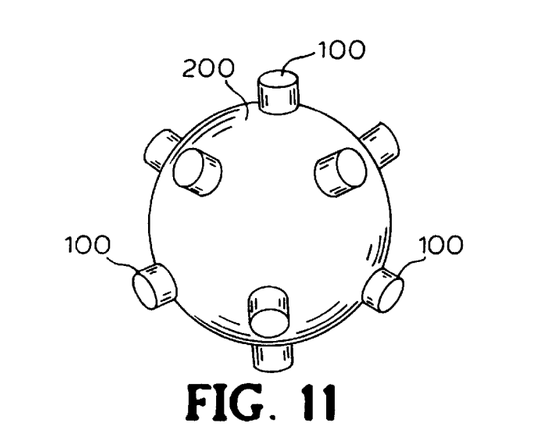
FIG. 11 is a schematic view of an electromagnetic track ball.
Figure 12:
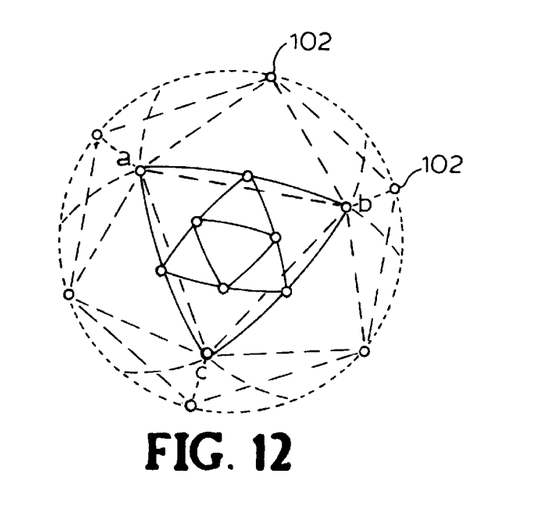
FIG. 12 is a schematic diagram of a method of uniformly positioning electromagnets in the track ball of FIG. 11.
Figure 13:
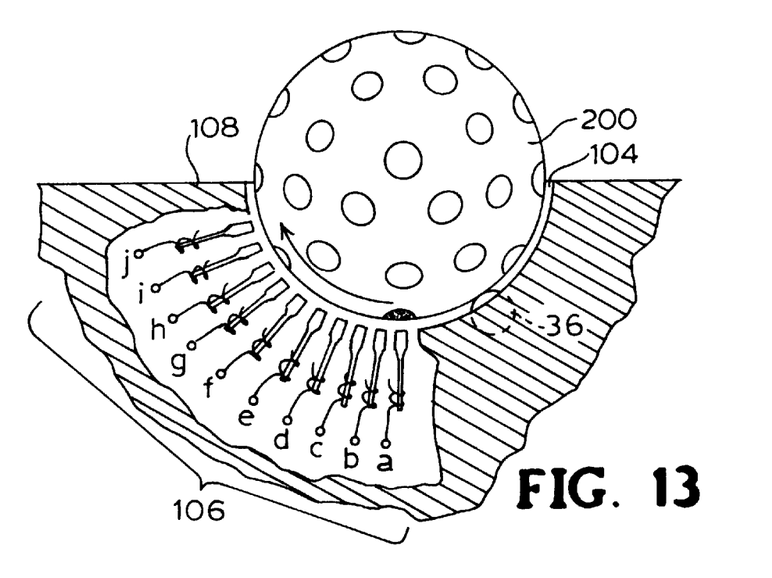
FIG. 13 shows a completed track ball of FIG. 11 plus electromagnetic pole pieces in the track ball base (or socket).

In a more sophisticated version, the track ball used in the invention herein may have a magnetic core as is known in the art, and electrical coils may be installed in the supporting structure of the track ball as known in the art. As shown in FIG. 11, in one version of this embodiment, a magnetized track ball of the invention has a plurality of cylindrical magnets 100 oriented so that the south poles of the magnets are toward the center of a sphere 200 composed of a ferromagnetic material such as soft iron, and the north poles aim outwards. The location of the north poles is preferably made regular using the vertices 102 of equilateral spherical triangles formed when the track ball sphere is circumscribed over a regular polyhedron, such as an icosahedron as shown in FIG. 12. If each of the spherical triangles is further subdivided into smaller spherical triangles as shown centrally in FIG. 12, additional location points for cylindrical magnets can be determined. Clearly, the process of subdivision can be continued indefinitely until a sufficient density of regularly placed locations for the cylindrical magnets has been realized. The completed track ball 20 preferably has a molded plastic around the ferromagnetic core until the whole assembly is a smooth sphere with the poles spaced at regular intervals (FIG. 13).

Figure 14:
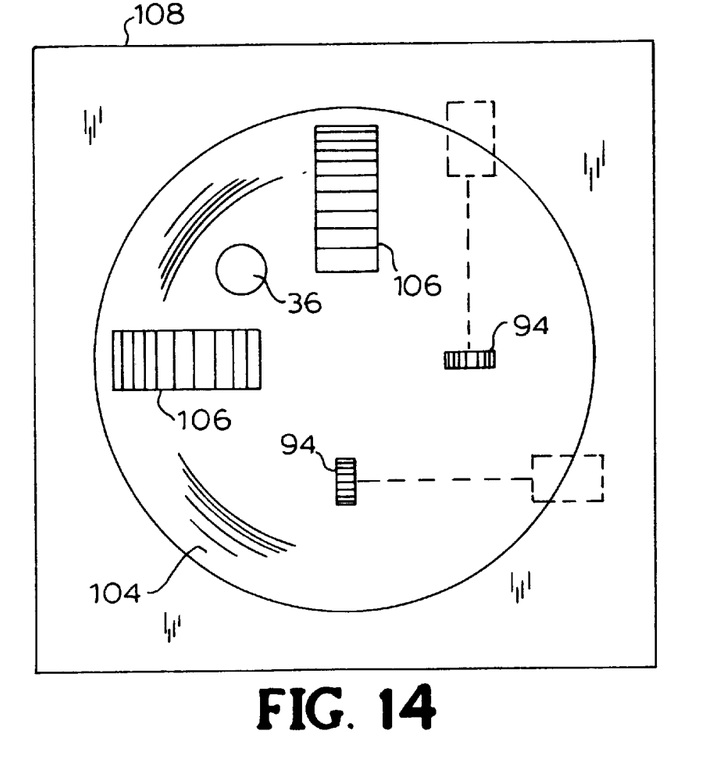
FIG. 14 is a top view of the track ball base (or socket) of FIG. 13.

The track ball 20 with the cylindrical magnets 100 is placed in a socket 104 or shell in a track ball support base 108 which contains conventional idlers 36 and encoder pick-up wheels 94, but which also contains two sets of electromagnetic pole pieces 106. One set is shown in FIG. 13; the other set is at right angles to the first set (either into or out of the plane of the paper). The support base 108 of this embodiment is shown schematically in FIG. 14. Groups, (for example, pairs) of electromagnets 100 are energized in sequence, i.e., current flows through the windings so as to make the electromagnet pole pieces facing the sphere strong south poles. The other electromagnets 100 have a smaller current flowing in the opposite direction so the poles are weak north poles, which is just enough to counteract any induced attraction between the north poles in the sphere and the iron cores of the unenergized electromagnets. For example, a sequence of energizing of a-b, b-c, c-d, e-f, etc. (FIG. 13), would move the ball to pull it in the direction indicated by the arrow. The track ball movement, while not completely smooth, is sufficiently accurate for typical track ball use to control cursor movement. Increasing the number of cylinder magnets and adjusting the sequence of the energized groups can be used to smooth out the movement of the track ball. Depending on the way the coils are installed and powered, different effects may be accomplished. Manipulation of the orientation of the magnetic core and the number and orientation of the external coils, may then be used to provide stopping, damping, and movement of the track ball.

The above-discussed effects may be combined, so that the effect of changing the height of the ball with damping and/or forcing ball movement may be used separately or together in a particular environment or software system. High resolution combination is particularly useful with virtual reality type software, whereas in other instances, low resolution damping and/or forcing may be desired.

Figure 10:
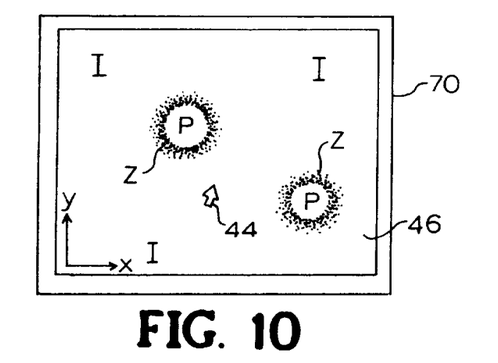
FIG. 10 is a schematic diagram of use of the third embodiment.

The software for use with the powered ball may be programmed as is known in the art. For example, if a cursor is in a region in which the ball is not to be powered to or away from any region (e.g., the "I" region discussed above), the software would not direct the powering mechanisms at all. If the cursor is in a graduated zone Z in which there is to an increasing density of dots as the cursor approaches a protected area P, the directions to the powering mechanism could be in response to a look-up table of power as a function of dot density, or a closed form function for dot density, e.g. a Gausian equation such as:

$$\text{density} = \sum_i^{n_i} e \text{ with } n_i = \frac{-((x-a_i)^2 + (y-b_i)^2)}{2\sigma_i^2}$$

where [x,y] is the cursor position and the coordinate pairs $[a_i, b_i]$ correspond to all positions of maximum dot density and $\sigma_i$ is a range parameter. A large $\sigma_i$ corresponds to a gradual decrease of density from the $[a_i, b_i]$ position and a small $\sigma_i$ corresponds to a sharp decrease. In the example shown in FIG. 10, the sets of points $[a_i, b_i]$ would all be points on the two circles centered in the positions P and located at radii which correspond to maximum density. If at some point [x,y], the magnitude of the derivative of the density with respect to x or y is large, then a large current is sent respectively to the x or y motivator. If the derivative is zero, then no current is sent. The sense of the motion produced by the current is always such that the density is reduced (if repulsion from the areas, P in FIG. 10 is the desired effect) and increased (if attraction is desired).

Finally, a simple example will further illustrate the method just discussed. Referring to the coordinate system in the lower left of FIG. 10, if the display contains a single attractive point located at position [x,y]=[2,3] and the range parameter $\sigma$=0.5 so that the density or repulsive force is reduced by $e^{-2}$=0.13 at a distance of 1away from the point, assuming the embodiment shown in FIG. 10, the motor currents are:

$$i_x = -4k(x-2)\exp[-2(x-2)^2 - 2(y-3)^2]$$
$$i_y = -4k(y-3)\exp[-2(x-2)^2 - 2(y-3)^2]$$

where k is a constant related to the actual current/torque characteristic of the particular motors which are being powered.

It should be noted that the "dots" do not have to be displayed on the screen, but the controlling software needs to be programmed to "know" where the effect controlled this way is located, for example, as a function of x,y coordinates in a table accessible by the software.

The control system of the second and third embodiments of the invention is analogous to that discussed above with respect to the first embodiment. Instead of controlling elevation of the ball and receiving feedback as to the height of the ball, the control system controls the braking and/or motive systems as described and receives feedback as to the location of the cursor.

The interactive effect of the track ball movement changes that depend on where the cursor is placed on the screen may be synchronized with or enhanced by auditory output directed by the software, for example, as when the cursor is positioned on some menu containing a dense field of items on a screen, such as box containing instructions. The braking motion would then be felt in the ball each time the cursor was moved to a new position (like a detent), such as the positions for "save", "delete", "copy", "print", etc., which would be combined with computer-generated speech vocalization of the particular instruction. This is particularly useful as an aid to the visually impaired.

While the invention has been described with reference to specific embodiments, it will be appreciated that numerous variations, modifications, and embodiments are possible, and accordingly, all such variations, modifications, and embodiments are to be regarded as being within the spirit and scope of the invention. In particular, while the invention has been described in detail with respect to track balls, it is clear that the variation wherein the track ball is replaced by a mouse, modified analogous to the manner in which standard track balls are modified as described herein, is included within the scope of the invention.

What is claimed is:

1. A track ball control system, which is attachable to a computer system having a display screen and a cursor which is positionable on the display screen; said track ball control system comprising a trackball comprising a plurality of pairs of magnets energized in sequence by electromagnetic signals, causing movement of the track ball in a desired direction; and at least one track ball regulator for providing physical control of a track ball position in response to signals which are generated depending on the location of the cursor on the screen, wherein the track ball has a resultant change in movement in response to the signals which is distinct from direct control of the track ball by the operator.

2. The track ball control system of claim 1, wherein the resultant change in movement is azimuthal change.

3. The track ball control system of claim 1, wherein the track ball provides tactile feedback to the operator.

4. The track ball control system of claim 1, wherein the track ball provides resistance or aids operator-generated motion.

5. The track ball control system of claim 1, wherein the electromagnetic signals are by two sets of electromagnetic pole pieces, which sets are at right angles to each other.

6. The track ball device of claim 1, wherein the track ball is controlled in a software environment, and wherein the software environment is a visual environment.

7. The track ball device of claim 1, wherein the track ball is controlled in a software environment, and wherein the software environment is an auditory environment.

8. The ball device of claim 1, wherein the track ball is controlled in a software environment, and wherein the control system comprises a computer.

9. The track ball device of claim 1, wherein the control system further comprises an external controller.

* * * * *